Aug. 13, 1935.  G. A. LUNDY  2,011,340
LIME AND FERTILIZER SPREADER OR SEEDER
Filed Nov. 27, 1931   3 Sheets-Sheet 1
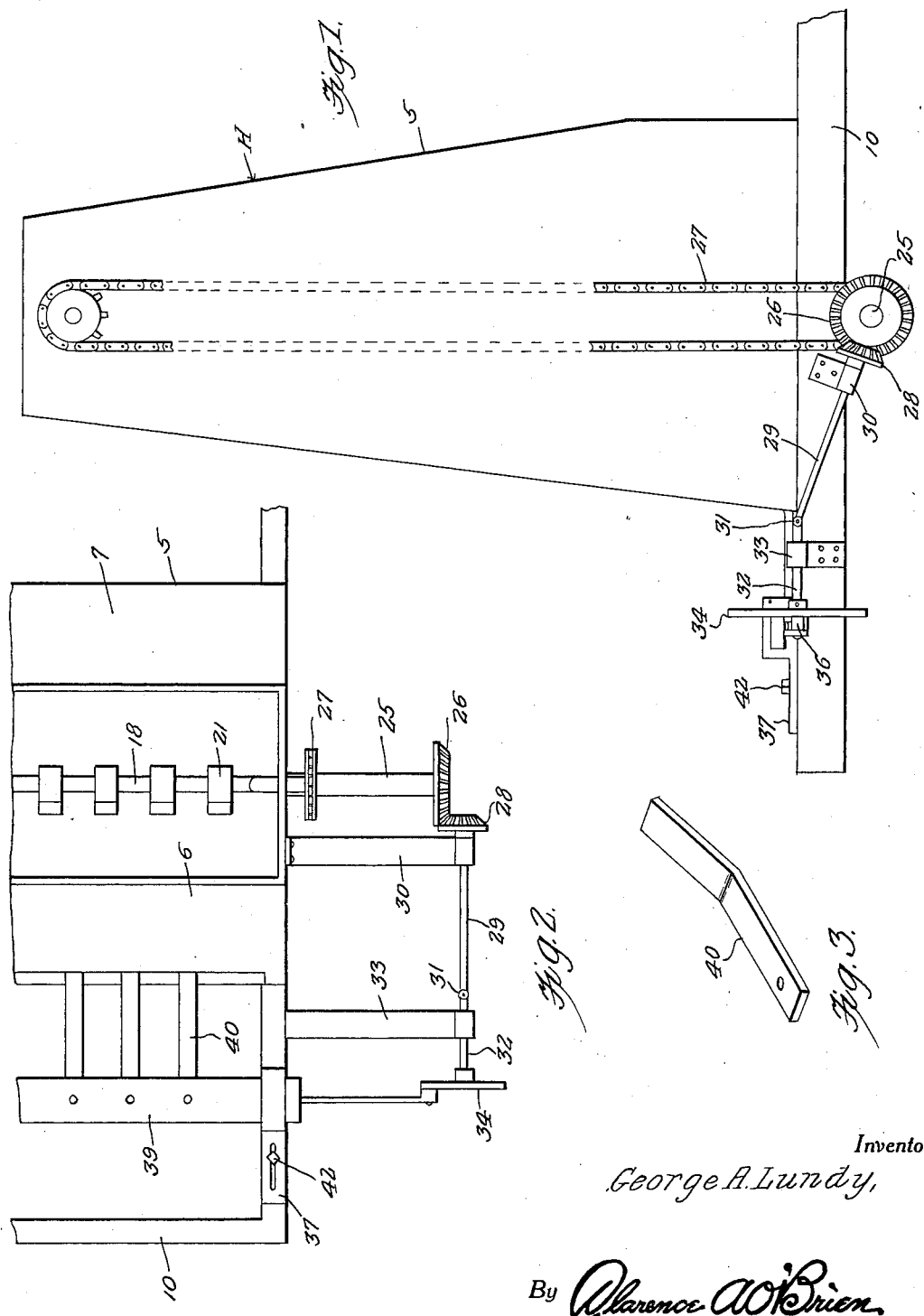
Inventor
George A. Lundy,
By Clarence A. O'Brien
Attorney

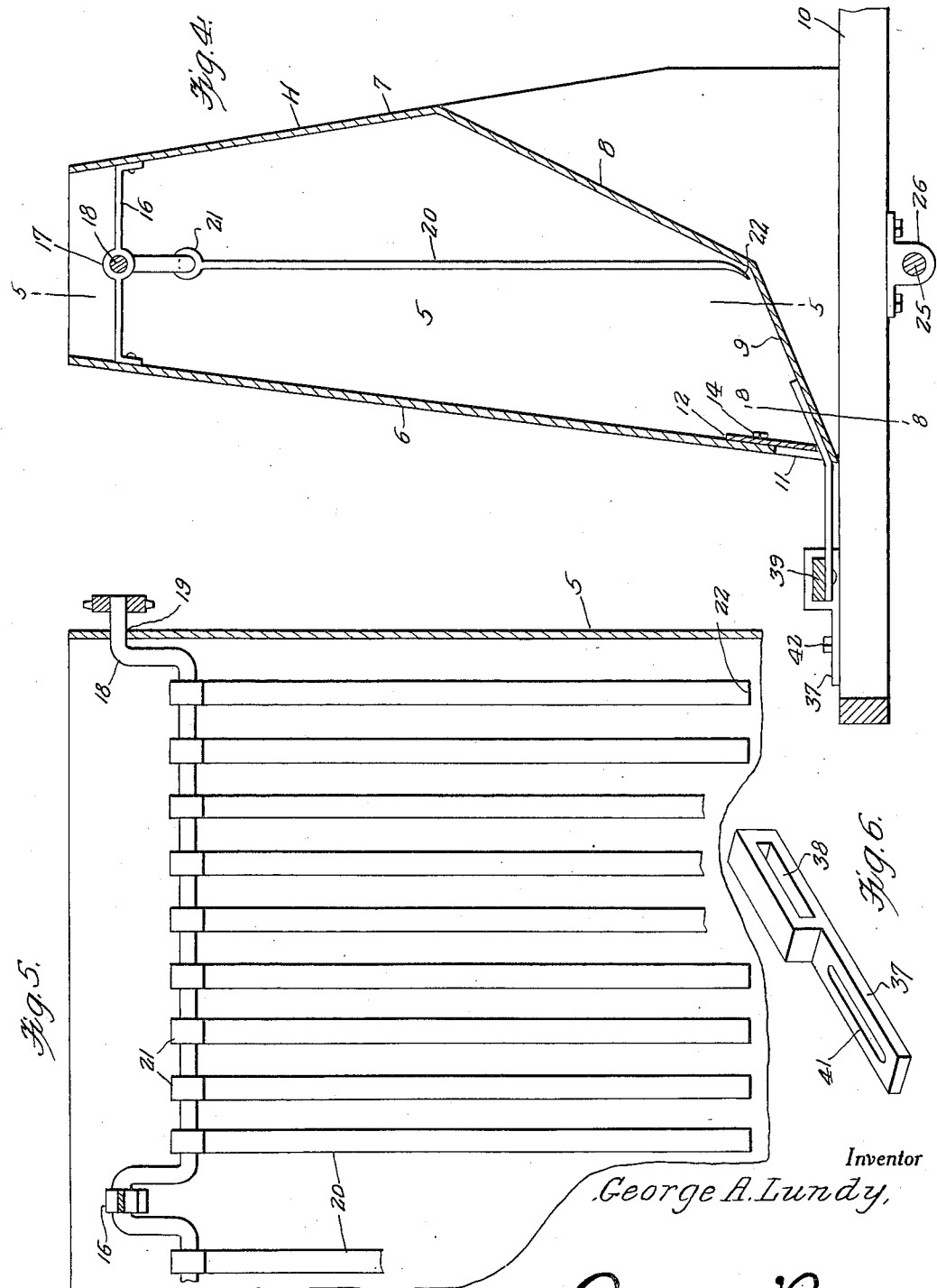

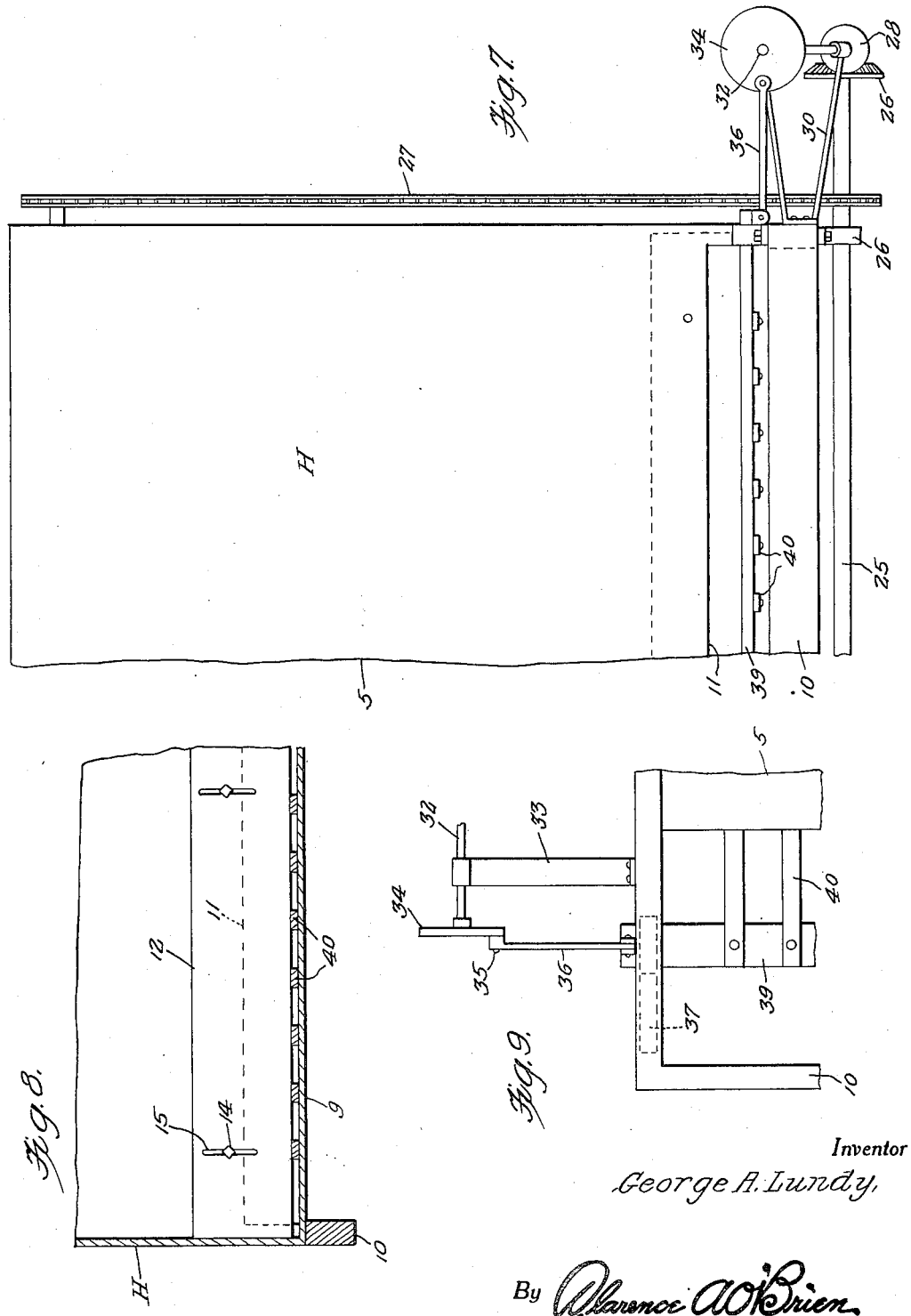

Patented Aug. 13, 1935

2,011,340

UNITED STATES PATENT OFFICE 2,011,340

LIME AND FERTILIZER SPREADER OR SEEDER

George A. Lundy, Decorah, Iowa

Application November 27, 1931, Serial No. 577,614

6 Claims. (Cl. 221—120)

The present invention relates to machines for sowing and distributing commercial fertilizer such as lime and the like.

An important object of my invention is to provide improved means for agitating the fertilizer and to provide improved feeding devices adapted to cooperate therewith.

Another very important object of the invention resides in the provision of a machine of this nature which is exceedingly simple in its construction, strong and durable, inexpensive to manufacture, adjustable, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of the machine embodying the features of my invention.

Figure 2 is a fragmentary top plan view thereof.

Figure 3 is a perspective view of one of the tooth bars.

Figure 4 is a vertical longitudinal section through the machine.

Figure 5 is a fragmentary vertical section taken substantially on the line 5—5 of Figure 4.

Figure 6 is a perspective view of a bracket.

Figure 7 is a fragmentary rear elevation of the machine.

Figure 8 is a detail vertical section taken substantially on the line 8—8 of Figure 4, and Figure 9 is a fragmentary bottom plan view showing the tooth bars and the operating means therefor.

Referring to the drawings in detail, it will be seen that the letter H denotes generally a hopper comprising sides 5, a rear wall 6, a front wall 7, and a bottom including inclined portions 8 and 9, the former portion being more inclined than the latter portion. This hopper is mounted on a frame 10 to rise therefrom. It will be noted that the walls 6 and 7 diverge downwardly from each other. The back wall 6 is provided with an opening 11 at the bottom end thereof. A plate 12 is mounted on the inside of the bottom end of the wall 6 to extend partially across the opening 11 and is adjustable by means of bolts 14 engaged in the wall 6 and extending through vertical slots 15 in the plate 12. A bracket 16 is mounted across the top of the hopper H between the walls 6 and 7 and has a bearing in the center thereof as at 17. A crank shaft 18 has its ends journalled in openings 19 in the upper portions of the side walls 5 and its central portion journalled in the bearing 17. On the crank shaft 18 are rods 20 having their upper ends formed with sleeves 21 rockable on the throws of the crank shaft. These rods 20 depend downwardly and terminate in curved ends 22 which when at their lowermost position are disposed adjacent the juncture of the bottom portion 8 with portion 9 as clearly illustrated in Figure 4.

A shaft 25 is disposed across the frame 10 in bearings 26 and has a chain and sprocket connection 27 with the crank shaft 18. A bevel gear 27' is mounted on the shaft 25 and meshes with a bevel pinion 28 on a shaft 29 journalled in bearing bracket 30. Shaft 29 has a universal coupling connection 31 with the shaft 32 journalled in a bearing bracket 33. A disk 34 is mounted on the rear end of the shaft 32 and has an eccentric pin 35 on which is rockable one end of a connecting rod 36. A pair of bracket plates 37 are mounted on the frame 10 to the rear of the hopper and have oblong longitudinal loops 38 through which is slidable a bar 39 with teeth 40 projecting forwardly therefrom and extending through the opening 11 and partially along the lower part of the hopper bottom portion 9 and under the plate 12. The bracket plates 37 have elongated slots 41 through which bolts 42 engaged in the frame extend so that these brackets may be adjusted longitudinally of the frame.

The connecting rod 36 is engaged with one end of the bar 39. Thus it will be seen that when the shafts 5, 29 and 32 rotate the rods 20 to move up and down in the hopper for proper agitation of the fertilizer therein so that the same will flow readily downwardly through the opening 11 as freely as is permitted by the adjustment of the plate 12 and of the teeth 40 which are simultaneously moved across the bottom of the hopper so as to properly and evenly dispense the fertilizer from the hopper in a manner to prevent clogging of the opening and to distribute the fertilizer evenly over the ground.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, in the combination and arrangement of parts may be resorted to without departing from the spirit or scope of the invention as hereinafter claimed or sacrificing any of its advantages.

Having thus described my invention, what I claim as new is:

1. A material dispensing device comprising a frame, a hopper on the frame having a bottom slanting downwardly toward the rear of the hopper, a discharge opening provided at the bottom of the rear wall of the hopper, a crank shaft in the upper part of the hopper having throws, a swingable depending agitator bar secured by its upper end on each one of the throws of the crank shaft, the lower end of said bars being arranged to assume positions close to the bottom of the hopper when the throws are in low position with the bars substantially perpendicular so as to loosen material on the bottom and push it toward the discharge opening, said bottom having a portion of greater inclination which the lower ends of said bars are adapted to touch as they move toward their said low position.

2. A material dispensing device comprising a frame, a hopper on the frame having a slanted bottom slanting downwardly toward the rear of the hopper said bottom having a forward portion of greater inclination, a discharge opening at the bottom of the rear wall of the hopper, a crank shaft in the upper part of the hopper, swingable depending agitator bars secured by their upper end on the throw of the crank shaft, the lower end of the bars being arranged to assume positions close to the juncture of the lower end of the portion of greater inclination and the bottom of the hopper when the throw is in low position so as to scrape material from the portion of greater inclination and loosen material on the bottom and push it toward the discharge opening, and a transversely reciprocable series of teeth on the frame and extended into the opening in the rear wall of the hopper for scraping the bottom and facilitating discharge of material from the hopper, said crank shaft and reciprocable series of teeth being connected for simultaneous operation.

3. A material dispensing device comprising a support, a hopper on the support and having a discharge opening in the lower end of its rear wall, a plate carried by the rear wall above said opening and adjustable vertically to restrict the opening, a plurality of transversely reciprocable teeth carried by the support and extending into the hopper through the said opening and below said plate for scraping material on the bottom of the hopper and distributing the material issuing from the hopper through said opening, agitator means in the hopper for scraping the bottom and moving the material in the hopper toward the opening, and means operatively connecting the agitator means and said plurality of reciprocable teeth for simultaneous operation.

4. A material dispensing device comprising a support, a hopper on the support comprising downwardly diverging front and back walls, the back wall being provided at its lower end with a transverse opening, adjustable closure means on the back wall for restricting the opening, the front wall having a lower portion inclined toward the back wall, the bottom of the hopper rising from the back wall to join the lower end of the said lower portion, a crank shaft journaled in the upper part of the hopper, a plurality of depending bars rockably mounted by their upper ends on the throw of the crank shaft, the lower ends of said bars being arranged to scrape the said lower portion and a part of the bottom as they move up and down and throw material in the hopper toward the said opening, a transversely reciprocable member supported on the support and having a plurality of teeth arranged through the said opening and in scraping relation to material on the hopper bottom and toward and away from which the closure means is adjustable, and means operatively connecting the crank shaft and the reciprocable member for simultaneous operation for dispensing and distributing material from the hopper.

5. A hopper having an opening in the lower part of its rear wall, a portion of the bottom of the hopper adjacent said opening being upwardly inclined so as to aid material in said hopper toward said opening, a plurality of spaced fingers lying through said opening and on said portion of the bottom of the hopper, said plurality of spaced fingers being operable transversely of said hopper for scraping said portion of the bottom of the hopper and aiding the discharge of material from said hopper through said opening, and means within said hopper operable to scrape another portion of said bottom and urge material in said hopper toward the first mentioned portion of the hopper and toward said opening, said plurality of fingers and said means being operatively connected for simultaneous action.

6. A hopper having an opening in the lower part of its back wall, a first portion of the bottom of the hopper defining the lower edge of said opening being upwardly inclined toward the front wall of the hopper, a second portion on said bottom slanting upwardly from the upper edge of said first portion at a sharper angle toward and connected to the front wall of said hopper, and depending agitators arranged in the hopper to move up and down and to swing so as to engage their lower ends with and scrape said second portion of said bottom, the lower ends of said agitators being curved toward the back wall of the hopper, so as to shovel material in the hopper along said first portion of the bottom toward said opening, and means operating said agitators.

GEORGE A. LUNDY.